United States Patent [19]

Ohkita et al.

[11] Patent Number: 5,279,864
[45] Date of Patent: Jan. 18, 1994

[54] RADIATION CURABLE PRIMER COATING COMPOSITIONS

[75] Inventors: Masakazu Ohkita, Osaka; Tetsuzo Arai, Takarazuka; Manasori Yoshiiwa, Wakayama; Koichi Yamada, Yawata; Iwao Sumiyoshi, Osaka; Ryoii Ishihara, Hirakata, all of Japan

[73] Assignees: Sumitomo Metal Industries, Ltd.; Nippon Paint Co., Ltd., both of Osaka, Japan

[21] Appl. No.: 750,733

[22] Filed: Aug. 21, 1991

Related U.S. Application Data

[60] Continuation of Ser. No. 210,173, Jun. 21, 1988, abandoned, which is a division of Ser. No. 776,074, Sep. 13, 1985, abandoned.

Foreign Application Priority Data

Sep. 13, 1984 [JP] Japan ................ 59-191936

[51] Int. Cl.$^5$ ................ B05D 3/06
[52] U.S. Cl. ................ 427/508; 427/410; 322/103; 428/35.9; 428/416
[58] Field of Search ........ 522/25, 16, 33, 40, 522/43, 48, 46, 53, 103; 427/410, 34.1; 428/35.9, 416

[56] References Cited

U.S. PATENT DOCUMENTS

| | | | |
|---|---|---|---|
| Re. 30,006 | 5/1979 | Sakayori et al. | 427/375 |
| 4,062,997 | 12/1977 | Hutts et al. | 428/378 |
| 4,180,598 | 12/1979 | Emmons | 522/103 |
| 4,213,486 | 7/1980 | Samour et al. | 138/143 |
| 4,232,086 | 11/1980 | Mori et al. | 428/341 |
| 4,260,465 | 4/1981 | Via | 522/16 |
| 4,345,004 | 8/1982 | Miyata et al. | 428/416 |
| 4,481,239 | 11/1984 | Eckner | 428/36 |
| 4,606,953 | 8/1986 | Suzuki et al. | 428/36 |

FOREIGN PATENT DOCUMENTS 58-168862 12/1981 Japan.

Primary Examiner—Ralph H. Dean
Attorney, Agent, or Firm—Millen, White, Zelano & Branigan

[57] ABSTRACT

A radiation curable primer coating composition is provided comprising (a) a reaction product of an epoxide compound and an ethylenically unsaturated monocarboxylic acid, (b) a compound of the formula:

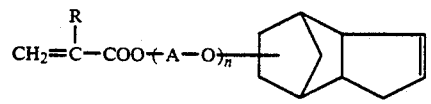

or

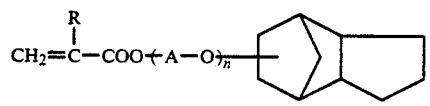

wherein R is hydrogen atom or methyl, A is a $C_2$–$C_4$ alkylene group, and n is 0, 1 or 2; and (c) a compound having at least one epoxy group per molecule.

The composition may be applied onto a steel substrate and cured by the irradiation of an actinic radiation for improving properties of subsequently applied polyolefin coatings thereon.

24 Claims, No Drawings

RADIATION CURABLE PRIMER COATING COMPOSITIONS

This application is a continuation of application Ser. No. 07/210,173 filed Jun. 21, 1988, which is a division of Ser. No. 06/776,074 filed Sep. 13, 1985 now abandoned.

BACKGROUND OF THE INVENTION

This invention relates to a radiation curable primer coating composition suitable for use in forming a polyolefin coating on a steel substrate.

Polyolefin coated steel pipes have been widely used as pipelines for conveying petroleum or natural gas. Since most of these pipelines are subjected to severe environmental conditions, high levels of adhesive and anticorrosive characteristics are required for the polyolefin coating layer.

Polyolefin resins are nonpolar and have crystalline nature and thus exhibit excellent chemical stability and excellent mechanical properties. However, their adhesion strength to a steel substrate are generally poor when polyolefin coatings are applied directly. It is for this reason that an adhesive layer consisting of a modified polyolefin such as ethylene-acrylic acid copolymers or ethylene-maleic anhydride copolymers is interposed between the polyolefin protective layer and the steel substrate. This modified polyolefin layer exhibits an excellent adhesion strength to the substrate but this adhesion strength tends to decrease the coated products are exposed to severe corrosive environment. In order to avoid this usually epoxy based primers are applied on the substrate surface. Thus the entire operation for producing polyolefin coated steel pipes include the steps of polishing the substrate surface to remove oxide films using such techniques as sand blasting or shot blasting, subjecting the substrate to a surface treatment such as chromate treatment if necessary, applying the epoxy primer, and curing the primer by heating to a temperature from 130° C. to 200° C. using an induction heater or hot air oven. After the applied primer coating has been fully cured so that the coating film is not easily scratched or peeled off when contacted by conveying rolls, the pipes are passed to next conveying rolls for extrusion coating the interposing adhesive layer and the polyolefin outer layer successively.

Epoxy primer compositions currently used for this purpose require heating to a temperature above 130° C. for about 3 to 4 minutes. This limits the productively of polyolefin coated steel pipes when the coating is carried out while continuously conveying pipes axially. In order to convey substrate pipes smoothly, the distance between adjacent conveying rolls should be less than one half of the pipe length. Assuming that the distance between adjacent conveying rolls is 3 m and a curing time of 3 minutes is required for curing the epoxy primer coating, the conveying speed is limited to less than 1 m/minute.

In addition to low productively, a substantial amount of heat energy is required for heating steel pipes.

It is therefore a principal object of the present invention to provide a primer coating composition free from these disadvantages for use in improving the adhesion strength of polyolefin layers to a steel substrate.

It is another object of the present invention to provide a primer coating composition of the above-mentioned type which cures within a very short length of time by irradiating with actinic radiation.

Other objects and advantages of the present invention will become apparent as the description proceeds.

SUMMARY OF THE INVENTION

According to the present invention, these is provided a primer coating composition which cures upon irradiation with actinic radiation, for improving the adhesion strength of polyolefin-based coating layer to a steel substrate. The composition comprises:

(a) a reaction product of an epoxide compound and an ethylenically unsaturated monocarboxylic acid (hereinafter referred to as "unsaturated epoxy ester");

(b) a compound of the formula:

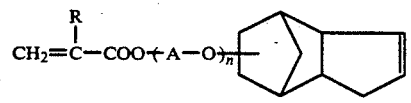

or

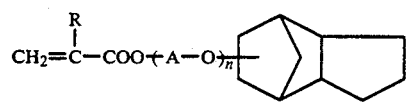

wherein R is hydrogen atom or methyl, A is a $C_2$–$C_4$ alkylene group, and n is 0, 1 or 2; and (c) a compound having at least one epoxy group per molecule. The proportions of said components (a), (b) and (c) are preselected to give a cured coating film having a glass transition temperature higher than 45° C.

The composition may additionally contain a liquid monomer and/or oligomer capable of polymerizing upon irradiation of actinic radiation.

The use of the primer coating composition of the present invention permits a permits a significant decrease in the length of time required for curing the primer coating by the irradiation of an actinic radiation. Thus, the productivity of polyolefin coated steel pipes, for example, may be greatly increased and a large amount of heat energy required for preheating substrate pipes and/or thermally curing the primer coating may be saved.

DETAILED DESCRIPTION OF THE INVENTION (a) Examples of unsaturated epoxy esters constituting component (a) are those produced by reacting an epoxide compound with an ethylenically unsaturate monocarboxylic acid.

Examples of epoxide compounds include a reaction product of bisphenol A and epichlorohydrine or methylepichlorohydrin (hereinafter collectively referred to as "(methyl)epichlorohydrin"); a reaction product of bisphenol A and/or bisphenol F, resorcinol and (methyl)epichlorohydrin; a reaction product of novolak or resol type phenol-form-aldehyde condensate and (methyl)epichlorohydrin; a reaction product of a polyol and (methyl)epichlorohydrin; a reaction product of a polybasic acid and (methyl)epichlorohydrin; a reaction product of a polyalkylene glycol and (methyl)epichlorohydrine and the like.

These epoxide compounds may be reacted with a monobasic and/or dibasic carboxylic acid free of ethylenic unsaturation, such as acetic acid, propionic acid, benzoic acid, succinic acid, adipic acid, dimer acid or phthalic acid, using the epoxide compound in large excess so that the reaction product has at least one remaining epoxy group per molecule. The term "epoxide compound" as used herein include such reaction products as well.

Examples of ethylenically unsaturated monocarboxylic acid include acrylic acid, methacrylic acid, crotonic acid, cinnamic acid, itaconic acid monoalkyl esters such as methyl or ethyl ester and mixtures of these acids.

The unsaturated epoxy ester of component (a) may be prepared by reacting the epoxide compound and the ethylenically unsaturated monocarboxylic acid in about stoichiometric amounts. The reaction may be carried out by heating reactants at a temperature from 100° C. to 130° C. preferably in the presence of a catalytic amount of a tertiary amine such as N,N-dimethylaniline, pyridine, triethylamine, hexamethylenediamine or N,N-dimethylaminoethyl methacrylate. The reaction may be continued for 5 to 10 hours to give the desired unsaturated epoxy ester (a).

(b) Examples of compounds of the formula

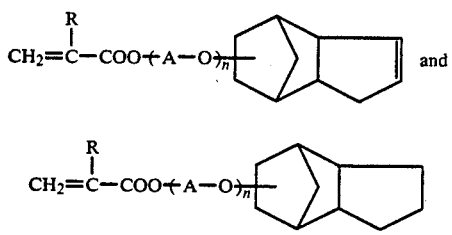

and include dicyclopentenyl acrylate or methacrylate (hereinafter collectively referred to as "(meth)acrylate"), dicyclopentyl (meth) acrylate, dicyclopentenyloxyethyl (meth)acrylate, dicyclopentyloxyethyl (meth)acrylate, dicyclopentenyloxypropyl (meth) acrylate, dicyclopentyloxypropyl (meth)acrylate, dicyclopentenyloxyethoxyethyl meth)acrylate, dicyclopentyloxyethoxyethyl (meth)acrylate and the like.

These compounds have a bulky structure and are useful to impart a relatively high glass transition temperature (Tg) to the fully cured coating film resulting from the primer composition of the present invention.

(c) Examples of having at least one epoxy group in the molecule compounds include the same epoxide compounds used for synthesizing the unsaturated epoxy esters of (a). Component (c) is used in an amount at least equal to a stoichiometric amount relative to the acid number of component (a) corresponding to the residual free carboxylic groups. By adding this component, the anti-alkali property of the resulting coating film may be enhanced.

The proportions of components (a), (b) and (c) are preferably 40-80 parts/20-60 parts/1-15 parts on weight basis.

The primer coating composition of the present invention may additionally contain a liquid monomer and/or oligomer capable of curing upon the irradiation of an actinic radiation.

Examples of monomers include methyl (meth)acrylate, ethyl (meth)acrylate, n-butyl (meth)acrylate, isobutyl (meth) acrylate, n-hexyl (meth)acrylate, 2-ethylhexyl (meth)acrylate, cyclohexyl (meth)acrylate, benzyl (meth)acrylate, 2-hydroxyethyl (meth)acrylate, 2-hydroxypropyl (meth)acrylate, 2-methoxyethyl (meth)acrylate, 2-ethoxyethyl (meth)acrylate, carbitol (meth)acrylate, dipropylene glycol monomethyl ether mono(meth)acrylate, triethylene glycol monomethyl ether mono (meth)acrylate, tetrahydrofuryl (meth)acrylate, styrene, α-methylstyrene, vinyltoluene, ethylene glycol di(meth)acrylate, diethylene glycol di(meth)acrylate, propylene glycol di(meth) acrylate, 1,6-hexanediol di(meth)acrylate, neopentyl glycol di(meth)acrylate, trimethylpropane tri(meth)acrylate and the like.

Examples of oligomers include unsaturated polyesters such as a condensate of phthalic acid, diethylene glycol and acrylic acid, and unsaturated polyurethanes such as produced by reacting one mole of trimethylolpropane, 3 moles of tolylenediisocyanate and 3 moles of 2-hydroxyethyl (meth)acrylate.

These monomers and oligomers are used for adjusting the viscosity of the primer composition and for adjusting Tg of the resulting film. However, excessive use of these monomers and/or oligomers tends to decrease the adhesion strength to the steel substrate. Accordingly, the combined amount of these monomers and/or oligomers plus component (b) should not exceed 60 parts by weight per 100 parts by weight of the entire composition.

The proportions of above-mentioned essential and optional components are preselected so that the composition gives a cured film having a Tg above 45° C. This is because polyolefin coatings applied on steel pipes, for example, require a high adhesion strength at elevated temperatures.

When the primer coating composition is cured by the irradiation with ultraviolet light, it is necessary for the composition to contain a photosensitizer. Any known photosensitizer may be used, including benzoin, benzoin methyl ether, benzoin isopropyl ether, anthraquinone, 2-ethylanthraquinone, benzophenone, acetophenone, 2,2-diethoxy-2-phenylacetophenone, 2-chlorothioxanthone, 2-methlthioxanthone, benzyldimethylketal, 2-hydroxy-2-methyl-1-phenylpropan-1-one and mixtures of these photosensitizers. These photosensitizers may be added in an amount from 0.1 to 2.0% by weight of the entire composition to accelerate the photochemical reaction involved.

The primer coating composition may contain, of course, other conventional additives such as antifoaming agents, anti-running agents, surface conditioning agents, anticorrosive agents, fillers, colorants, solvents and the like to such a extent that these additives do not adversely affect the properties of the primer coating.

Any known technique may be employed for applying the primer coating composition of the present invention onto substrates such as steel pipes. These include airless spraying, roller coating, brushing, drawing and the like.

The primer coatings applied on a substrate may be cured by exposure to actinic radiation. Ultraviolet light, electron radiation, X-rays or gamma rays may be employed. Electron accelerators, $Co^{60}$, X-ray generators and UV lamps may be used as radiation sources. As a UV source, high pressure mercury lamps, low pressure mercury lamps, ultra-high pressure mercury lamps, metal halide lamps or xenone lamps may be used. UV light or electron radiation is preferable when rapid curing time is required. The curing may be carried out in the atmosphere since the inhibitory effect of air on the polymerization reaction is not substantial. However, the use of inert gas atmosphere such as nitrogen gas atmosphere is more preferable for enhancing the curability of the primer coating. The length of curing time varies depending upon the nature and intensity of radiation used. For example, by the used of a plurality of 6 kW high pressure mercury lamps placed to achieve uniform irradiation of the coated surface, it is possible to finish the curing within 1-10 seconds.

Polyolefin coated steel pipes may be produced by the conventional method by extrusion coating the substrate first with modified polyolefin adhesive layer and then with polyolefin protective layer. Prior to applying the primer coating, the substrate surface may be provided with conventional conversion coatings such as phosphate or chromate conversion coatings by dipping the substrate in a treating bath or applying a treating liquid containing silica sol. This treatment may further improve the adhesion strength and cathodic desbonding resistance of the resulting polyolefin coated steel pipes when combined with the application of the primer coating of this invention.

The following examples are intended to illustrate the present invention in further detail. In these examples, all parts and percents are by weight.

EXAMPLE 1

A flash having a stirrer, a reflux condenser, a thermometer and a drip funnel was charged with 950 g of epichlorohydrin-bisphenol A epoxy resin (about 2 epoxy equivalents), 729 g of dicyclopentenyl acrylate, 1.8 g of hydroquinone and 9.1 g of N,N-dimethylaminoethyl acrylate. The mixture was heated to 100° C. Then 144 g (2 moles) of acrylic acid was added with stirring over 1 hour and reacted for additional 5 hours at the same temperature. The acid number of the resulting resin composition was 3.

EXAMPLE 2

The same flask as used in Example 1 was charged with 1900 g of epichlorohydrin-bispenol A epoxy resin (about 2 epoxy equivalents), 1363 g of dicyclopenyl acrylate, 3.4 g of hydroquinone, and 17.0 g of N,N-dimethylaminoethyl acrylate. The mixture was heated to 100° C. Then 144 g (2 moles) of acrylic acid was added with stirring over 1 hour and reacted for an additional 5 hours at the same temperature. The acid number of the resulting resin composition was 3.5.

EXAMPLE 3

The same flask as used in Example 1 was charged with 1884 g of epichlorohydrin-bisphenol A-resorcinol epoxy resin (about 2 epoxy equivalents), 1352 g of dicyclopentenyl acrylate, 3.4 g of hydroquinone and 16.9 g of N,N-dimethylaminoethyl acrylate. The mixture was heated to 100° C. Then 144 g (2 moles) of acrylic acid was added with stirring over 1 hour and reacted for an additional 5 hours at the same temperature. The acid number of the resulting resin composition was 2.8.

EXAMPLE 4

The flask as used in Example 1 was charged with 1884 g (about 2 epoxy equivalents) of epichlorohydrin-bisphenol A-resorcinol epoxy resin, 1352 g of dicyclopentenyloxyethyl acrylate, 3.4 g of hydroquinone and 16.9 g of N,N-dimethylaminoethyl acrylate. The mixture was heated to 100° C. Then 144 g (2 moles) of acrylic acid was added with stirring over 1 hour and reacted at the same temperature for additional 5 hours. The acid number of the resulting resin composition was 3.1.

EXAMPLE 5

The procedure of Example 4 was repeated except that an equivalent amount of dicyclopentenyloxyethoxyethyl acrylate was used as Component (b). An acid number of 3.4 was obtained.

EXAMPLE 6

The procedure of Example 3 was repeated except that 1352 g of carbitol acrylate was used instead of dicyclopentenylacrylate. The acid number of the product was 2.8.

EXAMPLES 7-13 AND COMPARATIVE EXAMPLES 1-2

A primer coating composition shown in Table I was applied on a steel plate of 3.2×70×150 mm size having a polished surface by sand blasting. The coating film was cured by irradiating UV light. A 2 kW high pressure mercury lamp (Japan Storage Battery Co., Ltd., Model HI-20N, light emission length 25 cm, equipped with a beam collector) was placed over a conveyor at a height of 8 cm. The coated plate was conveyed under the lamp in a direction transverse to the longitudinal axis of the lamp at a speed of 3 m/minutes.

Then a sheet of modified polyethylene (ADMER NE 050, Mitsui Petrochemical Industries, Ltd.) was heat bonded over the primer coating at 170° C. to form a layer having a thickness of 300-400 microns. Finally a preheated polyethylene film (low density polyethylene film having a melt index of 1.5, a density of 0.925 and a film thickness 3-4 mm) was lined by pressing the film against the steel plate at a pressure of 0.1 kg/cm² at a temperature of 170° C. for 2 minutes.

In Comparative Example 2, modified polyethylene coating was directly applied onto the sand blasted steel plate without applying any primer coating composition.

In Example 13, prior to applying the primer coating, the steel plate was preheated to a temperature of 50°-60° C., coated with a chromate based conversion coating liquid (prepared by mixing an aqueous solution of $CrO_3$ with ethylene glycol sufficient to reduce 40% of $CrO_3$ and further adding thereto colloidal silica having a particle size of 14 mµ) and allowed to stand until the applied coating was dried by the latent heat of the plate. The amount of coating was 1000-1200 mg/m² after drying.

The resulting polyolefin coated plates were tested on adhesion strength and cathodic desbonding resistance according to the following methods. The results obtained are shown in Table II.

Test Method:

1. Primary adhesion strength

The coating was scratched to form a plurality of parallel cut lines at a distance between lines of 10 mm to the full depth of the coating. A section of cut polyethylene film was peeled from the steel plate and its peel strength (adhesion strength) at 180° angle was measured at 20° C. and 60° C. respectively at a pulling speed of 10 mm/minutes using TENSILON tester.

2. Secondary adhesion strength

The same test as above was repeated except that the scratched sample was soaked in 3% saline for 1,000 hours at 60° C., taken out and tested on the peel strength at 20° C.

3. Cathodic desbonding resistance

The coated plate was provided with a plurality of holes having a diameter of 5 mm through the coating layer to expose the substrate surface in these areas. Then the sample plate was placed in 3% saline at for 30 days at 20° C. and a voltage was applied to the sample plate so that a potential of −1.5 volt was established relative to a standard Cu/CuSO$_4$ electrode. The degree of desbonding was judged by a distance through which a knife edge was penetrated.

TABLE I

| Components (parts) | Primer Formulations |  |  |  |  |  |  | Comparative |
|---|---|---|---|---|---|---|---|---|
|  | Ex. 7 | Ex. 8 | Ex. 9 | Ex. 10 | Ex. 11 | Ex. 12 | Ex. 13 | Ex. 1 |
| Resin Ex. 1 | 100 |  |  |  |  |  |  |  |
| Resin Ex. 2 |  | 100 |  |  |  |  |  |  |
| Resin Ex. 3 |  |  | 80 |  |  |  |  |  |
| Resin Ex. 4 |  |  |  | 100 |  | 100 | 100 |  |
| Resin Ex. 5 |  |  |  |  | 100 |  |  |  |
| Resin Ex. 6 |  |  |  |  |  |  |  | 100 |
| NK ester ABPE-4[1] |  |  | 20 |  |  |  |  |  |
| EPIKOTE 828[2] | 1 | 1 | 1 | 1 | 1 | 3 | 3 | 1 |
| Contents (parts) |  |  |  |  |  |  |  |  |
| (a) Unsaturated epoxy ester | 60 | 60 | 48 | 60 | 60 | 60 | 60 | 60 |
| (b) DCPD ester + Monomer | 40 | 40 | 32 | 40 | 40 | 40 | 40 | 40 |
| (c) Epoxide | 1 | 1 | 1 | 1 | 1 | 3 | 3 | 1 |
| Photosensitizer[3] (parts) | 5 | 5 | 5 | 5 | 5 | 5 | 5 | 5 |
| Tg, °C.[4] | 68 | 63 | 68 | 57 | 50 | 55 | 55 | 43 |

Remarks:
[1] 2,2-bis 4-acryloyloxy-poly(ethyleneoxy)-phenyl propane, Shin Nakamura Kagaku Kubushiki Kaisha.
[2] Epichlorohydrin-bisphenol A epoxy resin, Shell Chemical.
[3] Benzoin isobutyl ether.
[4] Measured according to TMA penetration method using Shimadzu thermal analyzer Model DT-30.

TABLE II

| | Test Results | | | | | | | Comparative | Comparative |
|---|---|---|---|---|---|---|---|---|---|
| | Ex. 7 | Ex. 8 | Ex. 9 | Ex. 10 | Ex. 11 | Ex. 12 | Ex. 13 | Ex. 1 | Ex. 2 |
| Primary Adhesion Strength (kg/cm) | | | | | | | | | |
| at 20° C. | 25 | 27 | 21 | 24 | 18 | 20 | >30 | 15 | peeled off |
| at 60° C. | 15 | 18 | 12 | 16 | 10 | 12 | 19 | peeled off | peeled off |
| Secondary Adhesion Strength (kg/cm, 20° C.) | 10 | 11 | 13 | 13 | 9 | 9 | 17 | peeled off | peeled off |
| Cathodic desbonding resistance (mm) | 8 | 6 | 10 | 5 | 5 | 3 | 1.5 | 9 | 25 |

As shown in Table II, polyolefin coated steel substrates having a primer coating of the present invention (Examples 7 through 13) are superior to a corresponding polyolefin coated substrate having no primer coating (Comparative Example 2) in terms of the adhesion strength and cathodic desbonding resistance. When the primer coating has a Tg less than 45° C. (Comparative Example 1), the secondary adhesion strength is not satisfactory. The conversion coating of the substrate prior to the application of primer coating (Example 13) further improves the cathodic desbonding resistance.

What is claimed is:

1. In a method of forming a polyolefin protective coating on a steel substrate comprising the steps of applying a radiation curable primer coating composition onto said substrate to form a film,
   irradiating said film with actinic radiation to cure the film, and
   extrusion coating the substrate with a modified polyolefin layer and then with a polyolefin layer successively, the improvement wherein (1) said radiation curable primer coating composition consists essentially of:

(a) an unsaturated epoxy ester reaction product produced from about stoichiometric quantities of an epoxide compound and an ethylenically unsaturated monocarboxylic acid and having an acid number corresponding to the residual free carboxylic groups;

(b) a compound of the formula:

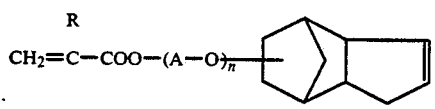

or

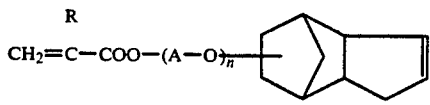

wherein R is a hydrogen atom or methyl, A is $C_2$-$C_4$ alkylene and n is 0, 1 or 2;

(c) an epoxide compound free of ethylenic unsaturation; and (d) as the sole agent therein which renders the composition radiation curable, a sufficient quantity to render the composition curable of a photosensitizer, to induce free radical polymerization of components (a) and (b) upon irradiation with UV light, selected from the group consisting of benzoin, benzoin lower-alkyl ether, anthraquinone, 2-ethylanthraquinone, benzophenone, acetophenone, 2,2-diethoxy-2-phenyl-acetophenone, 2-chlorothioxanthone, 2-methylthioxanthone, benzyldimethylketal, 2-hydroxy-2-methyl-1-phenylpropan-1-one and mixtures thereof; the composition containing said components (a), (b) and (c) at a weight ratio of 40-80:20-60:1-15 and an amount of component (c) at least equal to a stoichiometric amount relative to the acid number of component (a), to give a cured coating film having a glass transition temperature higher than 45° C.; and (2) wherein said film is cured by the irradiation with actinic radiation under such conditions that said component (c) acts as a scavenger of the residual free carboxylic groups corresponding to the acid number of said component (a) by the reaction of epoxide groups with the free carboxylic groups.

2. The method according to claim 1, wherein said radiation curable primer coating composition further comprises, as a reactive diluent, a radiation polymerizable liquid monomer and/or oligomer other than said component (b).

3. The method according to claim 2, wherein the combined amount of said component (b) and said monomer and/or oligomer is less than 60 parts per 100 parts by weight of the entire composition.

4. The method according to claim 1, wherein said component (a) is a reaction product of an epoxy resin and acrylic or methacrylic acid.

5. The method according to claim 4, wherein said component (b) is dicyclopentenyl acrylate, dicyclopentyl acrylate, dicyclopentenyloxyethyl acrylate, dicyclopentyloxyethyl acrylate, dicyclopentenyloxyethoxyethyl acrylate, dicyclopentyloxyethoxyethyl acrylate or corresponding ester of methacrylic acid.

6. The method according to claim 5, wherein said component (c) is an epoxy resin.

7. The method according to claim 1, wherein the photosensitizer is present in an amount of from 0.1 to 2.0% by weight of the entire composition.

8. The method according to claim 1, further comprising the step of applying a conversion coating onto said substrate prior to the application of said primer coating.

9. The method according to claim 1, wherein said substrate is a steel pipe.

10. The method according to claim 1, wherein said substrate is a steel sheet.

11. The method according to claim 1, wherein said modified polyolefin is a copolymer of ethylene with acrylic acid or maleic anhydride.

12. The method according to claim 1, wherein said polyolefin is ethylene.

13. A steel article of manufacture comprising a steel substrate having a polyolefin protective coating thereon, formed by the method of claim 1.

14. A steel article of manufacture comprising a steel substrate having a polyolefin protective coating thereon, formed by the method of claim 2.

15. A steel article of manufacture comprising a steel substrate having a polyolefin protective coating thereon, formed by the method of claim 3.

16. A steel article of manufacture comprising a steel substrate having a polyolefin protective coating thereon, formed by the method of claim 4.

17. A steel article of manufacture comprising a steel substrate having a polyolefin protective coating thereon, formed by the method of claim 5.

18. A steel article of manufacture comprising a steel substrate having a polyolefin protective coating thereon, formed by the method of claim 6.

19. A steel article of manufacture comprising a steel substrate having a polyolefin protective coating thereon, formed by the method of claim 7.

20. A steel article of manufacture comprising a steel substrate having a polyolefin protective coating thereon, formed by the method of claim 8.

21. A steel article of manufacture comprising a steel substrate having a polyolefin protective coating thereon, formed by the method of claim 9.

22. A steel article of manufacture comprising a steel substrate having a polyolefin protective coating thereon, formed by the method of claim 10.

23. A steel article of manufacture comprising a steel substrate having a polyolefin protective coating thereon, formed by the method of claim 11.

24. A steel article of manufacture comprising a steel substrate having a polyolefin protective coating thereon, formed by the method of claim 12.

* * * * *